May 13, 1952 W. M. PHELPS 2,596,958
MACHINE FOR FEEDING AND INSERTING SCREWS
Filed Sept. 1, 1948 6 Sheets-Sheet 1
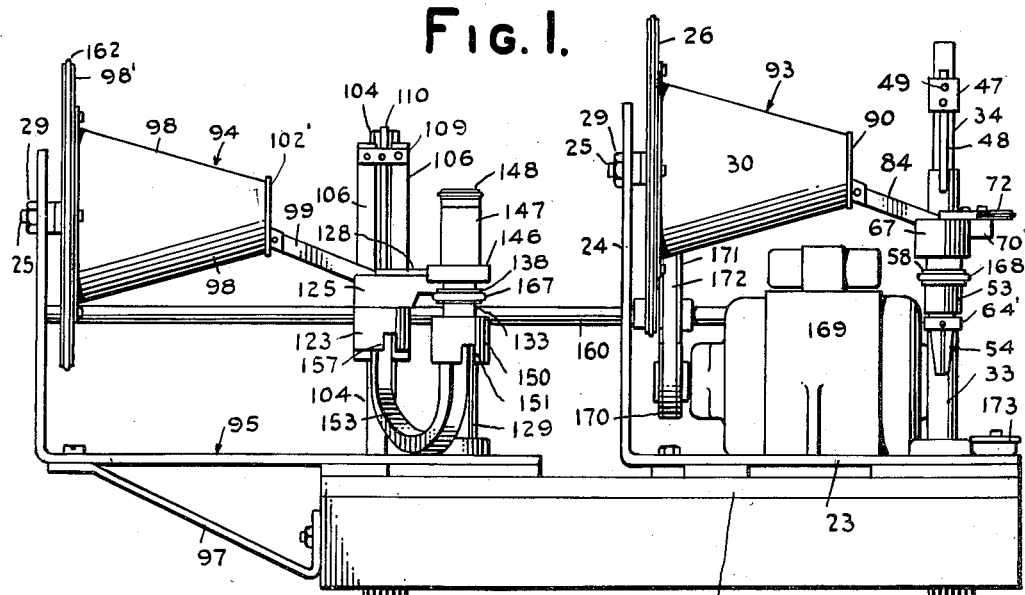
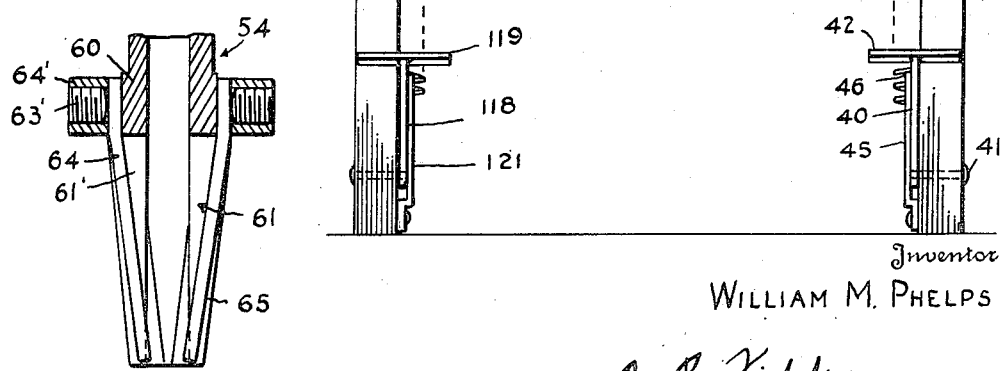
Inventor
WILLIAM M. PHELPS
ATTORNEY May 13, 1952 W. M. PHELPS 2,596,958
MACHINE FOR FEEDING AND INSERTING SCREWS
Filed Sept. 1, 1948 6 Sheets-Sheet 2

Inventor
WILLIAM M. PHELPS

By B. P. Fishburn

ATTORNEY

May 13, 1952 W. M. PHELPS 2,596,958
MACHINE FOR FEEDING AND INSERTING SCREWS
Filed Sept. 1, 1948 6 Sheets-Sheet 4

Inventor
WILLIAM M. PHELPS

ATTORNEY

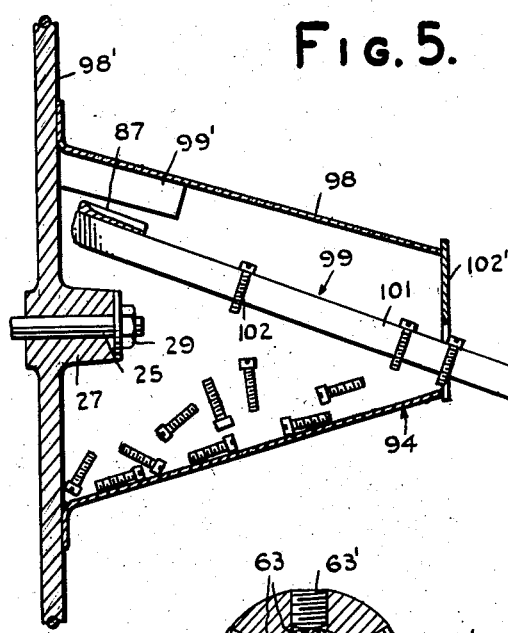
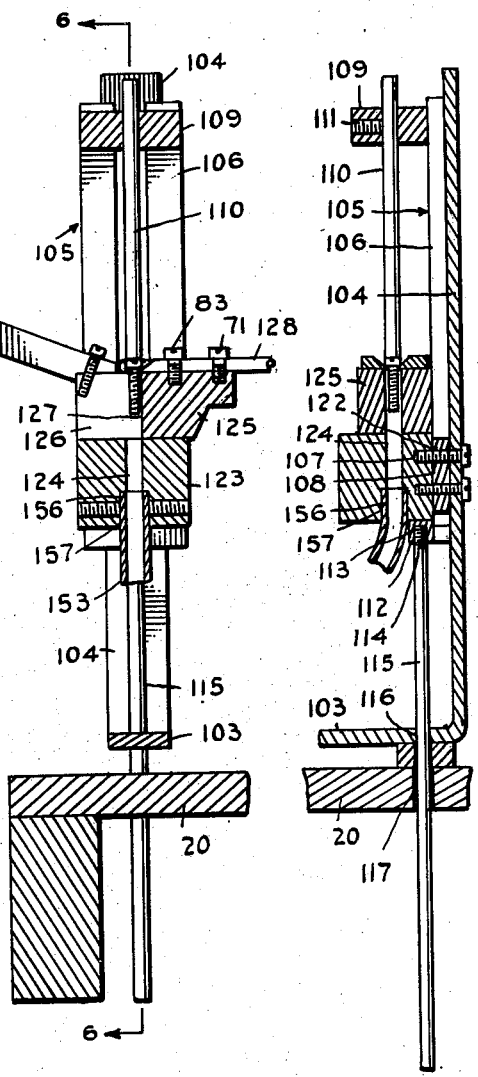
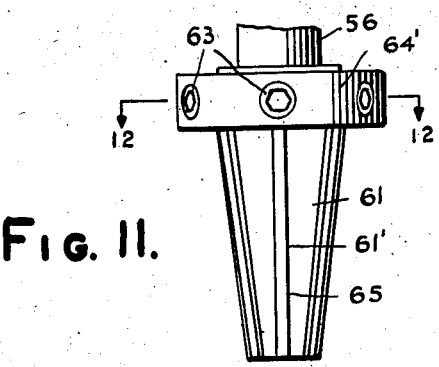
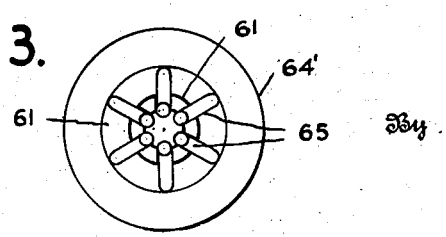

May 13, 1952 W. M. PHELPS 2,596,958
MACHINE FOR FEEDING AND INSERTING SCREWS
Filed Sept. 1, 1948 6 Sheets-Sheet 6

Inventor
WILLIAM M. PHELPS

By B. P. Fishburn

ATTORNEY

Patented May 13, 1952

2,596,958

UNITED STATES PATENT OFFICE 2,596,958

MACHINE FOR FEEDING AND INSERTING SCREWS

William M. Phelps, Chatsworth, Ga., assignor, by mesne assignments, to Chatsworth Manufacturing Co., Chatsworth, Ga., a corporation of Georgia Application September 1, 1948, Serial No. 47,285

5 Claims. (Cl. 144—32)

1

My invention relates to a machine for inserting screws in electrical outlet boxes and the like.

An important object of the invention is to provide a machine having means for feeding a plurality of machine screws to a revolving spindle, where the screws are individually resiliently held and rotated, so that they may be inserted into screw threaded openings of outlet boxes.

A further object is to provide a screw inserting machine having novel means for forcing the screws, one at a time, from the revolving spindle.

A further object is to provide a machine of the above mentioned character adapted to handle screws of two different sizes, and to apply one size of screw downwardly into the work and the other size upwardly.

A further object is to provide a machine of the above mentioned character which is extremely simple, compact and sturdy, the machine being adapted for inserting screws into a wide variety of work.

Other objects and advantages of the invention will be apparent during the course of the following description.

In the accompanying drawings, forming a part of this application, and in which like numerals are employed to designate like parts throughout the same, Figure 1 is a front elevation of the machine embodying the invention, Figure 2 is an end elevation of the same, Figure 3 is a plan view of the machine, Figure 4 is a vertical section taken on line 4—4 of Figure 3, parts broken away, Figure 5 is a fragmentary vertical section taken on line 5—5 of Figure 3, parts omitted, Figure 6 is a vertical section taken on line 6—6 of Figure 5, Figure 7 is a fragmentary side elevation of one screw inserting spindle and associated elements as viewed from the left in Figure 3, Figure 8 is a fragmentary centrally vertical section through the spindle shown in Figure 7, parts in elevation, Figure 9 is an enlarged fragmentary plan view of screw gripping jaws, Figure 10 is a vertical section taken on line 10—10 of Figure 9, Figure 11 is a side elevation of a screw gripping and inserting spindle, Figure 12 is a horizontal section taken on line 12—12 of Figure 11, Figure 13 is a bottom end elevation of the spindle in Figure 11, Figure 14 is a transverse vertical section taken on line 14—14 of Figure 3, parts omitted,

2

Figure 16 is an enlarged central vertical section through a screw gripping and inserting spindle, parts broken away.

Figure 2:
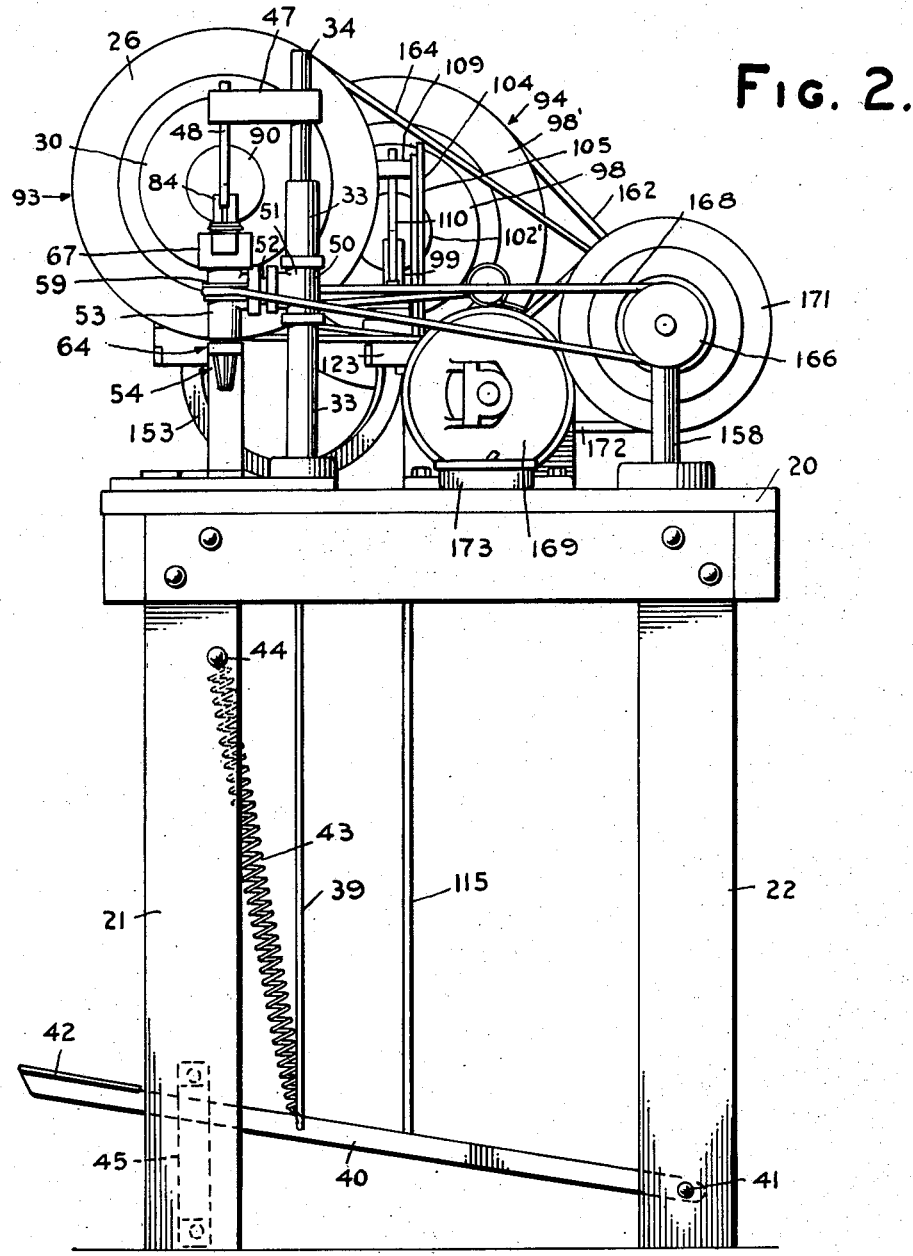
Figure 3:
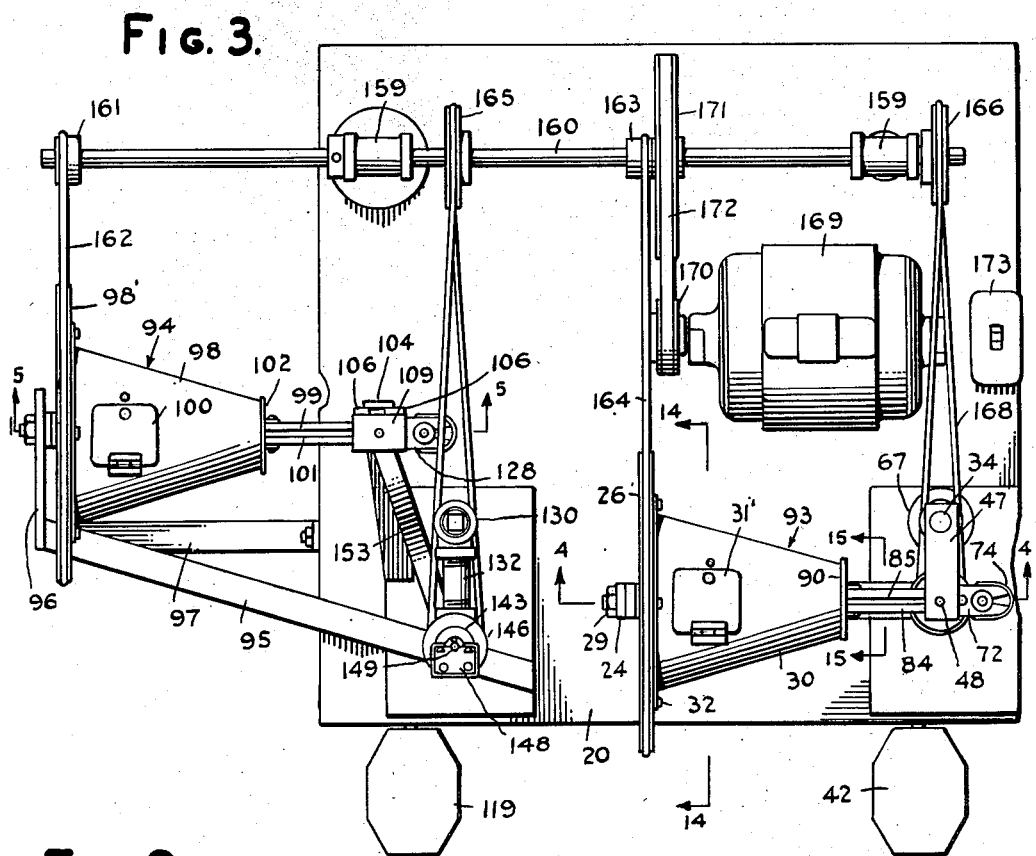

In the drawings, where for the purpose of illustration is shown a preferred embodiment of my invention, the numeral 20 designates a horizontal work bench or table having front and rear pairs of legs 21 and 22. Rigidly mounted upon the table near the forward edge of the same and near its right end, Figure 3, is a rigid L-shaped bracket 23 having a vertical arm 24 extending above the top of the table for a substantial distance. A horizontal bolt or shaft 25 is secured to the arm 24 near its top end, and rotatably mounted upon the shaft 25, outwardly of arm 24, is a large disc pulley or end 26, including a hub 27. A spacer 28 may be arranged between the hub 27 and arm 24, Figure 4. Nuts 29 serve to maintain the disc pulley 26 assembled upon the shaft 25. Mounted upon the outer flat face of the disc pulley 26 is a conical hopper 30 having an annular radial flange 31 secured to the outer face of the pulley by screws 32, or the like. The hopper 30 is provided in its side with a rectangular opening 30', and a hinged door or cover 31" is provided for the opening. The axis of the conical hopper 30 is horizontal and the hopper tapers outwardly toward the right end of the table 20, Figure 1. The axis of the hopper 30 is disposed a substantial distance above the top of the table such as one foot, although this distance may vary with the size of the machine. Rigidly mounted upon the top of the table 20 near the right end of the same, Figure 4, and slightly rearwardly of the bracket 23, is a vertical support or tube 33 the upper end of which is disposed substantially at the elevation of the horizontal axis of the shaft 25, as shown. Slidably mounted within the tube 33, and adapted to be shifted vertically therein, is a reciprocatory bar or plunger 34, which extends slidably through an opening 35 in the top of table 20. The lower end of the bar 34 is provided with a knuckle 36 pivotally connected with knuckles 37 of a head 38, rigidly secured to the top end of a vertically shiftable rod 39. The rod 39 extends downwardly behind the adjacent front leg 21, and is pivotally connected at its lower end to a foot lever 40, pivotally connected at 41 to the adjacent rear leg 22, near the lower end of the same.

The foot lever 40 extends forwardly of the front legs 21 and carries a pedal plate 42, rigidly secured thereto. A retractile coil spring 43 has its lower end connected to the lever 40 adjacent to rod 39, and its top end connected to a bolt 44 mounted upon the upper portion of the adjacent leg 21. The spring 43 serves to hold foot lever 40 upwardly, and to maintain the bar 34 in its uppermost position. Rigidly mounted upon the inner side of the leg 21 adjacent to the foot lever 40 is a vertical guide bar or strap 45, having upper and lower lateral ends 46. The foot lever 40 operates between the inner side of the leg 21 and strap 45, and has its vertical swinging movement limited by the lateral ends 46. Rigidly secured to the bar or plunger 34 near the upper end of the same is a forwardly projecting head or block 47. Rigidly secured to the block 47 near its forward end is a depending pin or plunger 48, secured in place by means of set screws 49, or the like, and by means of which the pin 48 may be adjusted vertically with respect to the block 47. The pin 48 is shiftable vertically, and is disposed at right angles to the horizontal axis of the hopper 30 and intersects this axis.

Between its ends, the tube 33 has mounted upon it a T-fitting 50 including a horizontal forwardly projecting arm 51. The arm 51 is connected through a short pipe 52 with a forward T-fitting 53, forming a stationary support or bearing for a vertical rotatable tubular spindle 54. Rigidly mounted within the T-fitting 53 is a bushing 55, the vertical bore of which rotatably receives a tubular shank 56 of the spindle 54. Rigidly mounted upon the shank 56 by means of countersunk set screws 57, and adapted to rotate with the spindle, is a horizontal grooved pulley 58. The pulley 58 serves as a thrust bearing to hold the spindle 54 against axial movement, and this pulley operates in a deep horizontal slot 59 formed in the forward side of T-fitting 53. The spindle 54 is provided near its lower end, and below the bushing 55, with an enlarged cylindrical head 60 carrying an annular group of spaced elongated depending rigid fingers or prongs 61, integral therewith, and forming narrow vertical passages or slots 61' therebetween. The spindle 54 has a central cylindrical bore 62 extending entirely through the shank 56, head 60 and fingers 61. The outer surfaces of the fingers 61 are preferably conically tapered toward their lower free ends, as shown. The narrow slots 61' extend from the bottom tips of the fingers 61 to the bottom of the enlarged head 60, and in axial alignment with the slots 61', the head 60 is provided in its outer cylindrical surface with a plurality of axial grooves or recesses 63. Seated within the axial recesses 63 is a plurality of resilient gripper prongs or fingers 64, which are bent inwardly at the bottom of head 60 for forming straight downwardly converging resilient portions 65 disposed within the slots 61', and arranged between the rigid fingers 61. The portions 65 are biased radially inwardly with respect to the fingers 61, Figure 16, and form inclined gripping elements to resiliently hold each screw 66 as it is fed downwardly through the bore 62 to the lower end of the spindle 54. The resilient prongs 64 are preferably formed of heavy spring steel wire, or the like. The prongs 64 are rigidly secured within the recesses 63 by means of set screws 63', which engage in screw threaded openings in an annular ring or collar 64' mounted upon and surrounding the head 60. The set screws 63' also serve to secure collar 64' to the head.

Rigidly mounted upon the top end of T-fitting 53 is a stationary head 67, provided in its inner side and top with a vertical slot 68, leading into a cylindrically curved end 69, in axial alignment with the bore 62. The slot 68 is wide enough to receive the heads of the screws 66 therein, and the diameters of the bore 62 and end 69 are such that the heads of the screws may pass through such bore and end. Rigidly mounted upon the top of head 67 is a block 70, carrying a vertical pivot screw 71. Slidably mounted upon the tops of block 70 and head 67 is a pair of opposed relatively thin flat gripping jaws 72. Each jaw 72 is provided in its outer end with a horizonal circularly curved recess 73, forming a seat for a U-shaped spring 74, surrounding the outer ends of the jaws. The inner ends of the spring 74 carry inwardly projecting lateral extensions 75, arranged within openings 76 in the outer sides of jaws 72. The spring 74 serves to maintain the jaws 72 biased closed at their inner ends, or at the left in Figure 9. The inner side of each jaw 72 is cut away near its outer end, forming diverging shoulders 77, providing lateral clearance to permit the inner ends of the jaws to swing open. Each jaw 72 is provided in its inner end and side with a notch 78, the longitudinal sides 79 of which diverge slightly, Figure 9. The ends 80 of notches 78 are circularly curved, as shown, and the sides 79 and ends 80 are inclined and converge downwardly, Figure 10. The notches 78 are disposed opposite each other and form a seat 81 for the heads of the screws 66 that move down a slide 84. The inner edges of the jaws 72 also have circularly curved recesses 82 to engage about the pivot screw 71. The spring 74 maintains these recesses 82 in engagement with the pivot screw 71. A stop screw 83 is mounted upon the head 67, between the pivot screw 71 and notches 78, and serves as a stop to limit the inward or closing movement of the same.

Figure 4:
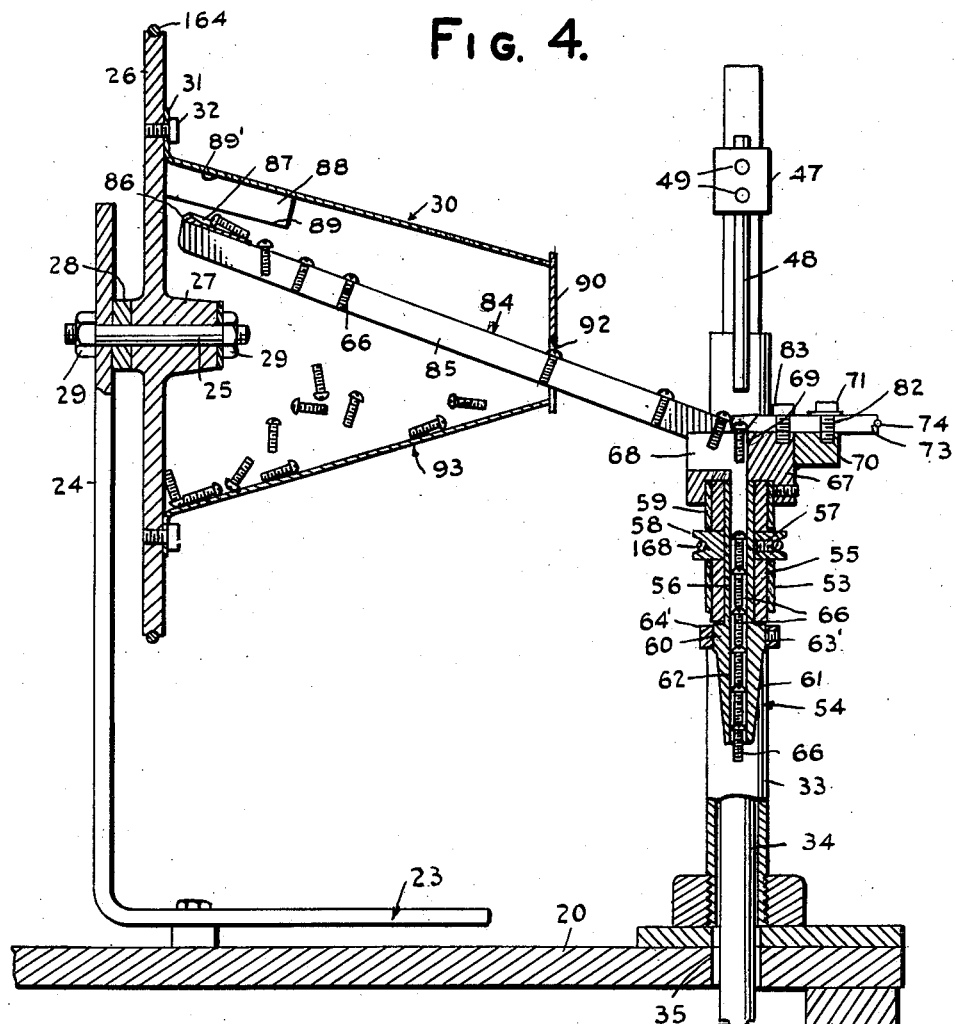

Rigidly mounted upon the top and left side of the head 67, Figure 4, and extending laterally thereof, and into the conical hopper 30, is the inclined guide or bar 84. The free end of the inclined guide 84 is disposed close to the inner face of disc pulley 26, and is spaced slightly below the top of the hopper 30, Figure 4. The guide 84 is provided with a central vertical longitudinal narrow slot 85 extending throughout its entire length, and leading into the wider slot 68. The slot 85 is of sufficient width to accommodate the screw threaded shanks of the screws 66, but is narrow enough to prevent the heads of the screws from entering the slot. The end 69 and bore 62 are of sufficient diameter to accommodate the heads of the screws 66 with enough clearance to permit the free movement of the screws through such end and bore. The top end of the inclined guide 84 is provided with a cap or seat 86, rigidly mounted thereon, and having a transversely curved recess 87 extending longitudinally of the slide and forming a seat to receive the screws 66 dumped onto the slide 84 in a manner to be described. Rigidly secured to the inner surface of the disc pulley 26 is a lateral extension 87' of a single flat radial bucket or vane 88, having its inner longitudinal edge 89 arranged parallel to the side wall of the hopper 30, as shown. The edge 89 is arranged close to the top of the seat 87, with enough clearance to permit the vane 88 to pass the seat and any screw 66 thereon without striking the same, as the hopper rotates. The outer longitudinal edge 89' of the vane contacts the wall of the hopper 30, as shown.

Mounted upon the inclined guide 84, adjacent to the outer open end of the hopper 30, is a substantially vertical end or baffle plate 90, forming a cover for the outer end of the hopper. The baffle plate 90 has a rectangular opening or notch 91 in its bottom for straddling the guide 84, and is provided with a notch 92 at the top of notch 91 to permit the heads of the screws 66 to pass the baffle plate.

It is thus seen that a screw feeding and inserting unit 93 is provided near the right end of the table 20, Figure 1, for inserting the screws 66 downwardly into the tops of electrical junction boxes, or other work, held beneath the lower end of the spindle 54.

Arranged at the left side of the table 20, Figure 1, is a companion unit 94, adapted to insert screws upwardly into the bottoms of the electrical junction boxes. The unit 94 comprises an L-shaped bracket 95, rigidly secured to the table 20 near its left end, and extending laterally outwardly of such end. The bracket 95 includes an upstanding vertical leg 96, corresponding to the arm 24, and a rigid bracket or brace 97 is mounted upon the adjacent side of the table and secured to the bracket 95 near its outer end, as shown. Rotatably mounted upon the upper end of leg 96 is a conical hopper 98, identical with the hopper 30 and having its horizontal axis of rotation arranged slightly below the axis of the hopper 30. The hopper 98 is rigidly secured to a vertical disc pulley 98', identical to the disc pulley 26, and a bucket or vane 99', identical to the vane 88, is rigidly secured to the disc pulley 98'. The connection between the disc pulley 98' and leg 96 is identical to that between the disc pulley 26 and arm 24. The hopper 98 has associated with it an inclined guide 99, identical to the guide 84, except that a longitudinal slot 101 in the guide 99 is slightly wider than the longitudinal slot 85, for accommodating shanks of somewhat larger screws 102 handled by the unit 94. The relation between the vane 99' and guide 99 is identical to that between the vane 88 and guide 84. An end plate 102' is provided, and is identical to the end plate 90. The hopper 98 has a hinged door or cover 100 identical to the cover 36'. The horizontal axis of rotation of the hopper 98 is arranged somewhat rearwardly of the axis of the hopper 30, Figure 3, and the entire hopper 98 overhangs the left end of the table, Figure 1.

Rigidly mounted upon the table 20 near its left end is an L-shaped bracket 103 having an upstanding vertical arm 104. This arm 104 is disposed slightly rearwardly of the horizontal axis of hopper 98. Slidably engaging the forward side of arm 104, and vertically shiftable along such side, is a slide 105, including laterally spaced parallel vertical bars 106. Rigidly secured to the forward face of arm 104 by means of screws 107, or the like, is a guide block 108 disposed between the bars 106 and serving to guide the slide 105 vertically. Rigidly secured to the upper end of the slide 105 is a forwardly projecting block or head 109, carrying a depending vertical pin or plunger 110, rigidly and adjustably secured to the block 109 by means of a set screw 111. Rigidly secured to the lower end of slide 105 is a forwardly projecting block or stop 112, having a screw threaded opening 113 to receive the upper screw threaded end 114 of a vertically shiftable rod 115, extending through openings 116 and 117 in the bracket 103 and table 20, respectively.

The rod 115 projects below the table and is pivotally connected in its lower end to a foot lever 118 identical with the foot lever 40. The foot lever 118 is pivotally connected to the adjacent rear leg 22 and projects forwardly of the table, and is provided with pedal plate 119. A retractile coil spring 120 is connected at its lower end to the foot pedal 118, adjacent to the rod 39, and the upper end of spring 120 is connected to a bolt mounted upon the adjacent forward leg 21. The spring 120 serves to bias the foot lever 118 and slide 105 upwardly. A guide strap 121, identical to the strap 45, may be mounted upon the inner side of the left leg 21, Figure 1, for guiding the foot lever 118.

The inner portions of screws 107 engage within screw threaded openings provided in a rear flat face 122 of a head 123, having a central vertical bore 124, disposed at right angles to the horizontal axis of the hopper 98 and intersecting such axis. The bore 124 is of sufficient diameter to receive the heads of screws 102. The stop 112 engages the bottom surface of the head 123 to limit the upward travel of the slide 105, Figure 6. Rigidly mounted upon the top of block 123 is a head or support 125, having a vertical slot 126 formed in its top and outer end. The slot 126 is arranged in registration with the slot 101, but has a greater width, to enable it to receive the heads of screws 102. The slot 126 is of the same width as the diameter of bore 124. Slot 126 leads into a vertical cylindrically curved end 127, in vertical alignment with the bore 124 and having the same diameter. The bore 124 and end 127 are of the proper diameter to accommodate the heads of the screws 102, as stated. Mounted upon the top of the head 125 is a pair of opposed jaws 128 identical to the jaws 72, and serving the same purpose. The top and outer end of the head 125 are rigidly secured to the lower end of the inclined guide 99, as shown.

Rigidly mounted upon the table 20 forwardly of the arm 104 and spaced therefrom slightly toward the arm 24, is a vertical support or bar 129 having a T-fitting 130 mounted upon its top end and including a forwardly projecting horizontal extension 131, connected through a short horizontal pipe 132 with a forward T-fitting 133, having a deep horizontal slot 134 formed in its forward side. The T-fitting 133 is provided with a vertical bushing 135, rotatably receiving a tubular shank 136 of a vertical spindle 137. A grooved pulley 138 is rigidly mounted upon the shank 136 for rotation therewith, by means of countersunk set screws 139, or the like. The pulley 138 forms a thrust bearing, to hold the spindle 137 against vertical movement. The spindle 137 further includes an enlarged cylindrical head 140 disposed above the bushing 135 and this head carries an annular group of spaced vertical elongated rigid fingers 141, identical to the fingers 61. The spindle 137 has central vertical main bore 142 of sufficient diameter to accommodate the heads of the screws 103. The head 140 has mounted upon it an annular ring or collar 143 identical to the ring 64 and rigidly mounted upon the head by set screws 144. The rigid fingers 141 have resilient gripping prongs or fingers 145 arranged between them and rigidly secured in recesses in the head 140 by the set screws 144. The resilient prongs 145 are identical to the prongs 64 and mounted upon the spindle 137 in the identical manner.

Figure 17:
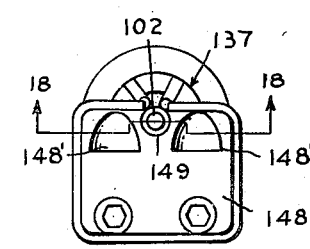
Figure 17 is an enlarged plan view of a rest and associated elements, and, Figure 18 is a vertical section taken on line 18—18 of Figure 17.
Figure 18:
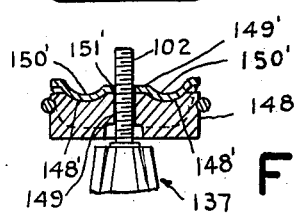
Figure 7:
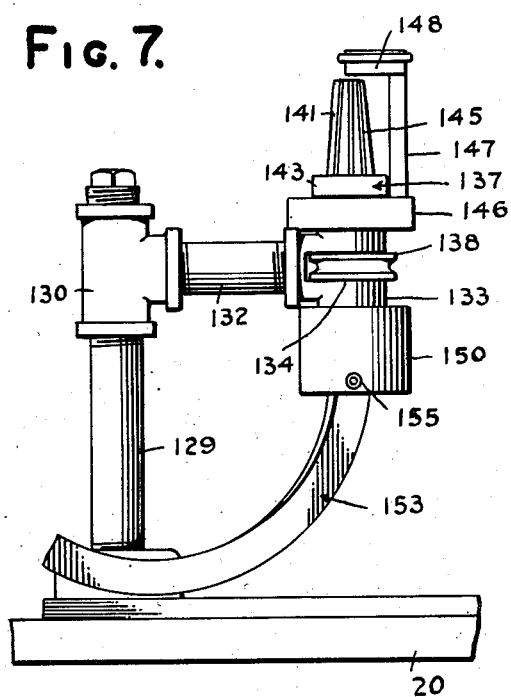

Rigidly mounted upon the top end of T-fitting 133 and arranged beneath the head 140 is a stationary annular collar 146 carrying a vertical post 147 disposed radially outwardly of the collar 143, and extending slightly above the top ends of the fingers 141. Rigidly secured to the top of post 147 is a block or rest 148 the lower surface of which is arranged slightly above the upper ends of rigid fingers 141. The rest 148 is provided in its inner edge with a circularly curved recess 149 in axial alignment with the bore 142 and being of substantially the same diameter. The rest 148 is provided in its top surface and upon opposite sides of the recess 149 with relatively shallow recesses 148', which are circularly curved in transverse cross section, Figure 18. The sides of the recesses 148' preferably converge slightly toward the inner edge of rest 148, Figure 17, and the recesses 148' are arranged near the inner edge of the rest, as shown. The rest 148 may serve as a seat or support for an electrical outlet box, or like work, into which screws 102 are inserted upwardly. It may be desired to apply a cable clamp 149' to the electrical junction box, simultaneously with the application of a screw 102 thereto. In this case the cable clamp 149' having spaced opposed cable receiving formations or crowns 150' is seated upon the rest 148, and the crowns 150 engage within the recesses 148', Figure 18. The clamp 149' has an opening 151' which registers with the recess 149, Figure 18, so that a screw 102 may be partially ejected from the spindle 137, to project upwardly through the recess 149 and opening 151. With the screw thus arranged within the opening 151, the clamp 149' will be held in place by the screw upon the rest 148, and the junction box may be brought into position above the screw and clamp so that the screw may be turned into the box by the spindle 137, for securing the clamp to the box. Rigidly mounted upon the lower end of the T-fitting 133 is a stationary block or head 150, preferably provided in its lower end with a transverse rectangular slot 151 for snugly receiving the top end 152 of a U-shaped conveyor tube 153, having a bore 154 through which the screws 102 may pass. The top end 152 is rigidly clamped in place within the slot 151 by means of diametrically oppositely arranged set screws 155 carried by the head 150. The lowermost end of the U-shaped tube 153 preferably engages the top of table 20, Figure 7, and the opposite upper end 156 of the tube 153 is rigidly secured within a transverse rectangular slot 157 formed in the bottom of head 123.

Rigidly mounted upon the table 20 near the rear corners of the same are upstanding posts or supports 158 carrying T-fittings 159 at their top ends, and adapted to serve as bearings for a horizontal rotatable shaft 160, journaled within the T-fittings or bearings 159. One end of the shaft 160 extends outwardly beyond the left end of the table, Figure 3, and has rigidly mounted upon its outer end a grooved pulley 161, receiving a belt 162, which engages the disc pulley 98' of the unit 94. Mounted upon the shaft 160 is a pulley 163, identical to the pulley 161, and in alignment with the disc pulley 26 of unit 93, Figure 3. The belt 164 engages the pulley 163 and associated disc pulley 26. Pulleys 165 and 166 also are rigidly mounted upon the shaft 160, in alignment with the pulleys 138 and 58 respectively. Belts 167 and 168 engage the pulleys 165 and 138, and 166 and 58, as shown. An electric motor 169 is securely mounted upon the table between the shaft 160 and unit 93. The armature shaft of this motor carries a pulley 170 in alignment with a large pulley 171 rigidly mounted upon the shaft 160. A drive belt 172 operatively connects pulleys 170 and 171. A motor switch 173 may be provided near the right end of the table, Figure 3.

The operation of the machine is as follows:

Referring first to the unit 93, which inserts the screws 66 downwardly through the revolving spindle 54, the hopper 30 is partially filled with the screws 66 which are introduced through the hinged cover 30'. It is preferred to introduce several pounds of screws into the hopper but the number of screws may be varied. With the motor 169 operating and driving the shaft 160, the hopper 30 revolves, and the radial vane 88 picks up the small number of the screws 66, which tend to remain at the bottom of the hopper, on each revolution, and carries these screws to the top of the hopper with the aid of centrifugal force. When the vane 88 is at the top of the hopper, Figure 4, and directly over the seat 86, the screws 66 will be dumped, and due to the law of averages, some of the screws will fall upon the seat 87 and enter the longitudinal slot 85, with their heads upwardly and supported by the inclined guide 84. The inclination of the guide 84 is such that the screws 66 will slide downwardly and enter the seat 81 formed by the recesses 78 of the jaws 72, having the inclined sides. The jaws 72 are held normally closed by the spring 74, and as one screw at a time enters the seat 81, it is supported or suspended above the bore 62 of the spindle 54, and is disposed within the slot 68. The operator now depresses the pedal 42 with his foot, moving the pin 48 downwardly. The pin engages the head of the screw being held between the jaws 72, and when this occurs the jaws will open, due to the action of the head of the screw upon the inclined surfaces of recesses 78, allowing the screw to drop into the bore 62 of the spindle 54 which is continuously revolving. As this process is repeated by the operator, the bore 62 will become partly filled with the screws 66, Figure 4, and the lowermost screw 66 will be resiliently held near and above the lower end of the spindle 54 by the gripper prong portions 65. When the next screw 66 enters the seat 81, and the pin 84 moves downwardly for its full travel as limited by the extension 46, the lowermost screw 66 in the spindle will be partially ejected therefrom. The prong portions 65 will yield radially outwardly to permit the screw threaded shank of the lowermost screw to project beyond the lower end of the spindle 54 for approximately a quarter of an inch. The operator now brings the screw threaded opening of the electrical junction box, or other work, into engagement with the ejected end of the lowermost screw so that the screw may be turned into the screw threaded opening by the revolving spindle 54. As the screw enters the screw threaded opening in the work, the prong portions 65 yield further to permit the head of the screw to be drawn out of the lower end of the spindle. When this occurs, the next lowermost screw in the spindle will be held above the lower end of the spindle by the resilient prong portions 65 until another screw enters between the jaws 72 and is pushed downwardly by the pin 48. When this occurs another screw is of course partially ejected at the bottom of the spindle, as previously described. The travel of the pin 48, as controlled by the extensions 46 of guide strap 45, is such that the lowermost screw in the spindle always is ejected the proper distance. The above described operation may be continuous and quite rapid, but if the operator chooses not to depress the pedal 42, the slot 85 soon will be filled with screws so that no additional screws can be accommodated by it. If the hopper 30 continues to revolve while the slot 85 is full of screws, no damage will be done to the machine, as the additional screws dumped onto the slide 84 will simply fall back into the hopper.

Figure 8:
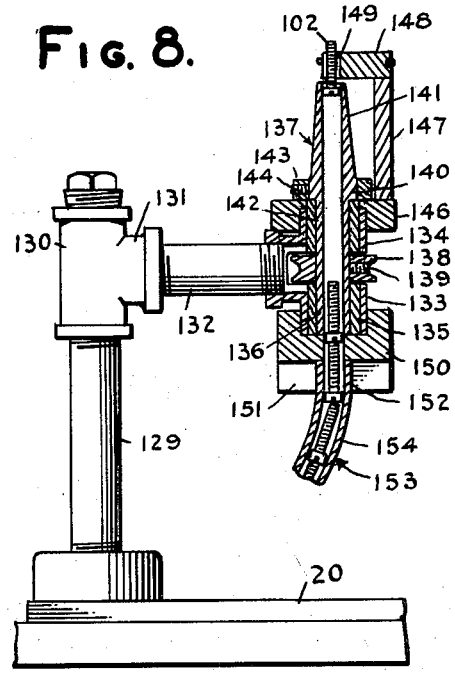
Figure 14:
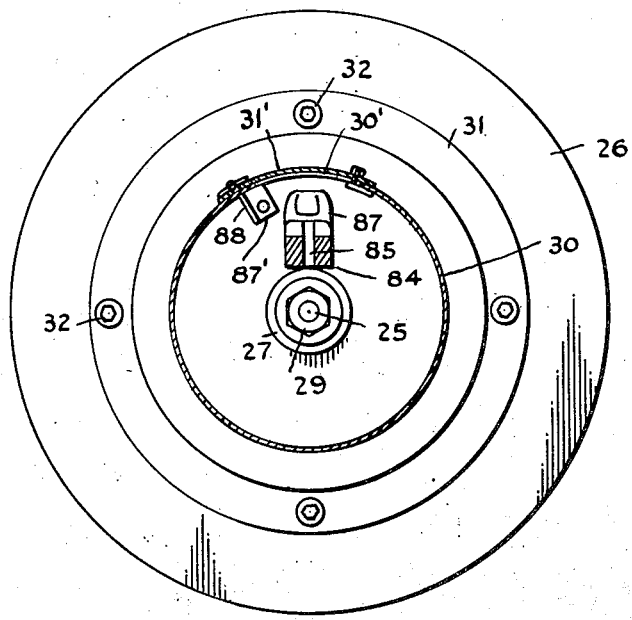
Figure 15:
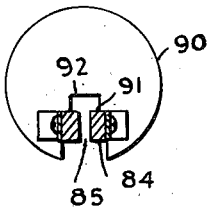
Figure 15 is a vertical section taken on line 15—15 of Figure 3, parts omitted.

The operation of the unit 94 is substantially identical with the above described operation of the unit 93, and differs only in that the screws 102 must be fed by the pin 110 through the U-shaped conveyor tube 153 and upwardly into the spindle 137. The operator depresses the pedal 119 to operate the pin 110 in the same manner that the pin 48 is operated, the vertical movement of the pin 110 being properly limited by the strap 121. The function and purpose of the jaw 128 are identical with those of the jaws 72. Likewise, the function of the rotary hopper 98, guide 99 and associated elements, is identical to that of the corresponding elements of the unit 93. When the U-shaped tube 153 and spindle 137 are partly filled with the screws 102, by repeated actuations of the pin 110 and one more screw is forced into the head 125, between the jaws 128, the uppermost screw 102 in the spindle 137 will be partially ejected, and the shank of this screw enters the recess 149 and projects slightly above the rest 148, preferably for about a quarter of an inch. The work is held upon or slightly above the rest 148, so that the uppermost screw, Figure 8, may be turned into the work. The resilient prongs 145 function identically with the prongs 65, and further discussion of the operation of unit 94 is thought to be unnecessary. The operation of the unit 94 in connection with the application of the cable clamps 149' has been explained.

It is thus seen that I have provided efficient, practical and rapid means for inserting screws upwardly and downwardly into various types of work. The machine is very sturdy, and there is little likelihood of any of the screws becoming jammed during their travel toward the ends of the spindles 54 and 137.

It is to be understood that the form of the invention herewith shown and described is to be taken as a preferred example of the same, and that various changes in the shape, size and arrangement of parts may be resorted to, without departing from the spirit of my invention or the scope of the subjoined claims.

Having thus described my invention, I claim:

1. A machine for inserting screws comprising a non-rotatable support member having an opening to receive one screw at a time, a pair of pivoted gripping jaws arranged adjacent to the entrance of the opening and being resiliently biased closed and extending over the opening, the jaws being recessed to permit the passage of the shank of a screw into the opening of the support member but serving to hold the head of the screw so that it cannot enter the opening of the support member while the jaws are closed, a substantially vertical tubular spindle rotatably mounted beneath the support member for receiving screws from the opening of the support member one at a time, resilient means carried by the spindle near its lower end and engaging the lowermost screw within the spindle to yieldably hold the same while it is turned into work and releasing the screw when it is fully engaged with the work, a reciprocatory non-rotatable plunger arranged above the support member and jaws and engaging the head of each screw held by the jaws to force the screw downwardly into the bore of the spindle, the jaws then spreading apart to permit the passage of the screw and plunger between same and closing automatically when the plunger is withdrawn, and stop means connected with the plunger to limit the extent of its downward movement so that each descent of the plunger will shift the lowermost screw in the spindle into engagement with said resilient means.

2. A machine for inserting screws comprising a non-rotatable support member having an opening to receive screws, a pair of pivoted gripping jaws arranged adjacent to the top of the support member and extending over the opening thereof, resilient means connected with the gripping jaws to maintain them closed, the closed jaws being recessed to provide an opening above the opening in the support member large enough to permit the shanks of screws to enter the opening of the support member, but preventing the passage of their heads into the same, said recesses forming inclined faces to facilitate opening the jaws, a substantially vertical tubular spindle rotatably mounted beneath the support member to receive screws therefrom, resilient means carried by the spindle for engagement with the lowermost screw within the same and yieldably holding such screw as it is turned into work, and a reciprocatory non-rotatable plunger rod arranged above the support member and jaws and engaging the head of each screw held by the gripping jaws to force the same downwardly into the bore of the spindle, the action of the head of the screw on the inclined faces of the jaws causing the jaws to separate and permit the passage of the plunger rod between the same, the jaws closing automatically when the plunger rod is elevated above the jaws.

3. A machine for inserting screws comprising a support member having a substantially vertical opening for receiving screws, gripping jaws mounted upon the support member to hold each screw over the opening of the support member and adapted to be opened so that the screws may enter the opening one at a time, a substantially vertical tubular spindle rotatably mounted beneath the support member for receiving the screws therefrom when the jaws are opened, the lower end of the spindle having a plurality of circumferentially spaced slots, inclined resilient prongs secured to the spindle and extending through the slots and having their lower ends projecting radially inwardly of the slots and into the bore of the spindle, the prongs engaging and resiliently holding each screw as it passes to the lowermost end of the spindle so that the screw can be fed into work, the prongs releasing each screw as it becomes fully engaged with the work, and a non-rotatable plunger arranged above the support member to engage each screw head held by the gripping jaws and force the same through the jaws and into the opening of the support member, whereby each lowermost screw is forced into engagement with said resilient prongs.

4. A machine for inserting screws comprising a non-rotatable support member having a substantially vertical opening to receive the screws, a pair of pivoted gripping jaws mounted upon the support member and extending over the top of the opening and being resiliently biased closed, the closed jaws being recessed to form an opening leading into the opening of the support member which will permit the passage of the shank of a screw through the closed gripping jaws but prevent the passage of the head of the screw therethrough, the recesses forming inclined faces, a rotatable tubular spindle having a substantially vertical bore operatively connected with the support member for receiving screws therefrom, resilient means carried by the spindle for engaging the screws near the discharge end of the spindle and resiliently holding the screws as they are turned into work by the spindle, and a non-rotatable reciprocatory plunger arranged above the support member and gripping jaws and engaging each screw held by the gripping jaws to force the same beyond the jaws and into the opening of the support member, the heads of the screws coacting with said inclined faces for spreading the jaws apart, the jaws closing automatically when the plunger is elevated.

5. A machine for inserting screws comprising a relatively stationary support member having a substantially vertical opening to receive screws, a pair of pivoted gripping jaws mounted upon the support member above the opening and being resiliently biased closed, the closed jaws having opposed recesses forming an opening smaller than the opening of the support member and receiving the shanks of screws but preventing the passage of their heads into the opening of the support member, a substantially U-shaped tube having one end connected with the support member for receiving screws therefrom, the other end of the U-shaped tube being upwardly directed so that the screws passing through the same from the support member are fed upwardly, a rotary tubular spindle connected with the last-named end of the U-shaped tube for receiving screws therefrom, resilient means carried by the spindle for engaging each screw near the upper discharge end of the spindle and resiliently holding the screw so that it may be turned into work, and a non-rotatable reciprocatory plunger arranged above the support member and engaging each screw held by the gripping jaws to force the same into the opening of the support member, the jaws opening to permit the passage of the plunger between the same and closing automatically when the plunger is elevated.

WILLIAM M. PHELPS.

REFERENCES CITED

The following references are of record in the file of this patent:

UNITED STATES PATENTS

| Number | Name | Date |
|---|---|---|
| 1,598,447 | Kleppinger | Aug. 31, 1926 |
| 2,025,273 | Dellaree | Dec. 24, 1935 |
| 2,256,012 | Blair | Sept. 16, 1941 |
| 2,263,858 | Borge | Nov. 25, 1941 |
| 2,322,024 | Hutchison | June 15, 1943 |
| 2,373,992 | Billinghurst | Apr. 17, 1945 |
| 2,471,793 | Stull | May 31, 1949 |
| 2,506,835 | Johnson | May 9, 1950 |
| 2,534,140 | Moore | Dec. 12, 1950 |
| 2,544,165 | Krasnow | Mar. 6, 1951 |
| 2,554,732 | Doyle | May 29, 1951 |